US012761936B2

(12) United States Patent
Luo et al.

(10) Patent No.: US 12,761,936 B2
(45) Date of Patent: Oct. 13, 2026

(54) MANAGING VIRTUAL WORKLOAD PRIORITIES IN A COMPUTING ENVIRONMENT

(71) Applicant: VMware LLC, Palo Alto, CA (US)

(72) Inventors: Shengjie Luo, Mountain View, CA (US); Pranshu Jain, San Jose, CA (US); Charan Krishna Singh, Bangalore (IN)

(73) Assignee: VMware LLC, Palo Alto, CA (US)

( * ) Notice: Subject to any disclaimer, the term of this patent is extended or adjusted under 35 U.S.C. 154(b) by 602 days.

(21) Appl. No.: 18/217,657

(22) Filed: Jul. 3, 2023

(65) Prior Publication Data

US 2024/0385864 A1 Nov. 21, 2024

(30) Foreign Application Priority Data

May 15, 2023 (IN) ............................ 202341034025

(51) Int. Cl.
*G06F 9/455* (2018.01)

(52) U.S. Cl.
CPC .. *G06F 9/45558* (2013.01); *G06F 2009/4557* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS 8,966,318 B1 * 2/2015 Shah .................. G06F 11/3698 714/28
2005/0262504 A1 * 11/2005 Esfahany ............. G06F 9/5077 718/1
2012/0036515 A1 * 2/2012 Heim .................... G06F 9/5088 718/105
2020/0159587 A1 * 5/2020 Li ......................... G06F 9/4881
2020/0183703 A1 * 6/2020 Kumar ................ G06F 9/45558
2020/0249987 A1 * 8/2020 Jiang ..................... G06F 9/5077
2024/0256353 A1 * 8/2024 Lenihan .................. G06F 9/505

OTHER PUBLICATIONS

Jayasekara et al., "A Resource and Policy Aware VM Scheduler for Medium-Scale Clouds", pp. 1-6, Aug. 2015, url:<https://www.researchgate.net/publication/280884008_A_Resource_and_Policy_Aware_VM_Scheduler_for_Medium-Scale_Clouds> (Year: 2015).*

* cited by examiner

*Primary Examiner* — Mustafa A Amin
(74) *Attorney, Agent, or Firm* — Kim & Stewart LLP

(57) ABSTRACT

Described herein are systems, methods, and software to manage virtual workload priorities in a computing environment. In at least one example, a management service determines when preemption is required to deploy a virtual machine in a computing environment. When preemption is required, the management service identifies one or more hosts in the computing environment capable of supporting the virtual machine when at least one preemptible virtual machine of one or more preemptible virtual machines is stopped on a corresponding host of the one or more hosts. The management service then selects a host from the one or more hosts for the virtual machine, stops the at least one virtual machine, and deploys the virtual machine on the host.

12 Claims, 7 Drawing Sheets

MANAGING VIRTUAL WORKLOAD PRIORITIES IN A COMPUTING ENVIRONMENT

RELATED APPLICATIONS

Benefit is claimed under 35 U.S.C. 119 (a)-(d) to Foreign application No. 202341034025 filed in India entitled "MANAGING VIRTUAL WORKLOAD PRIORITIES IN A COMPUTING ENVIRONMENT", on May 15, 2023, by VMware, Inc., which is herein incorporated in its entirety by reference for all purposes.

BACKGROUND

In computing environments, virtualization can be employed to use the resources of the underlying computers and hardware of the computing environment more efficiently. In some examples, host computers or hosts can abstract the physical hardware of the underlying computer and provide the abstracted hardware to virtual machines executing thereon. The abstracted hardware can include processing resources, memory resources, storage resources, networking resources and the like. The virtual machines can provide various operations including database processing, front-end web services, query management, networking operations, or some other operation.

In some implementations, while virtualization can more efficiently use the resources of the underlying computers, limitations can exist when limited physical resources are available for new virtual machines. For example, a user can generate a request for a virtual machine to be deployed in the computing environment, but physical resources for the virtual machine can be unavailable due to allocation to one or more other virtual machines. Accordingly, difficulties can arise in determining whether a currently executing virtual machine workload should be removed, which virtual machine should be removed, or whether resources should be modified for the virtual machines. These difficulties can continue during the execution of the virtual machines as different workloads can require additional or fewer resources during the lifecycle of the virtual machine to support the desired operation.

Overview

The technology disclosed herein manages virtual workload priorities in a computing environment. In one implementation, a method includes determining when preemption is required to deploy a virtual machine in a computing environment. The method further includes, when preemption is required to deploy the virtual machine, identifying one or more hosts of a plurality of hosts in the computing environment capable of supporting the virtual machine when at least one preemptible virtual machine of one or more preemptible virtual machines is stopped on a corresponding host of the one or more hosts. The method also provides prioritizing the one or more hosts based on a quantity of preemptible virtual machines on each of the one or more hosts and selecting a host from the one or more hosts to deploy the virtual machine based on the prioritization of the one or more hosts. The method further includes stopping the at least one preemptible virtual machine on the host and deploying the virtual machine on the host.

In one implementation, a method includes determining when preemption is required to deploy a virtual machine in a computing environment. In response to determining that preemption is required, the method further provides, prioritizing preemptible virtual machines in the computing environment based on resource usage associated with the preemptible virtual machines. The method also includes selecting one or more of the preemptible virtual machines for preemption based on the prioritization and resource requirements of the virtual machine and stopping the one or more preemptible virtual machines to support the deployment of the virtual machine.

In one implementation, a method includes monitoring resource desirability information for a virtual machine on a host and determining when the resource desirability information for the virtual machine satisfies one or more criteria. The method further includes, in response to determining that the resource desirability information satisfies the one or more criteria, increasing resource shares for the virtual machine on the host and decreasing resource shares for one or more other preemptible virtual machines on the host.

DETAILED DESCRIPTION

Figure 1:
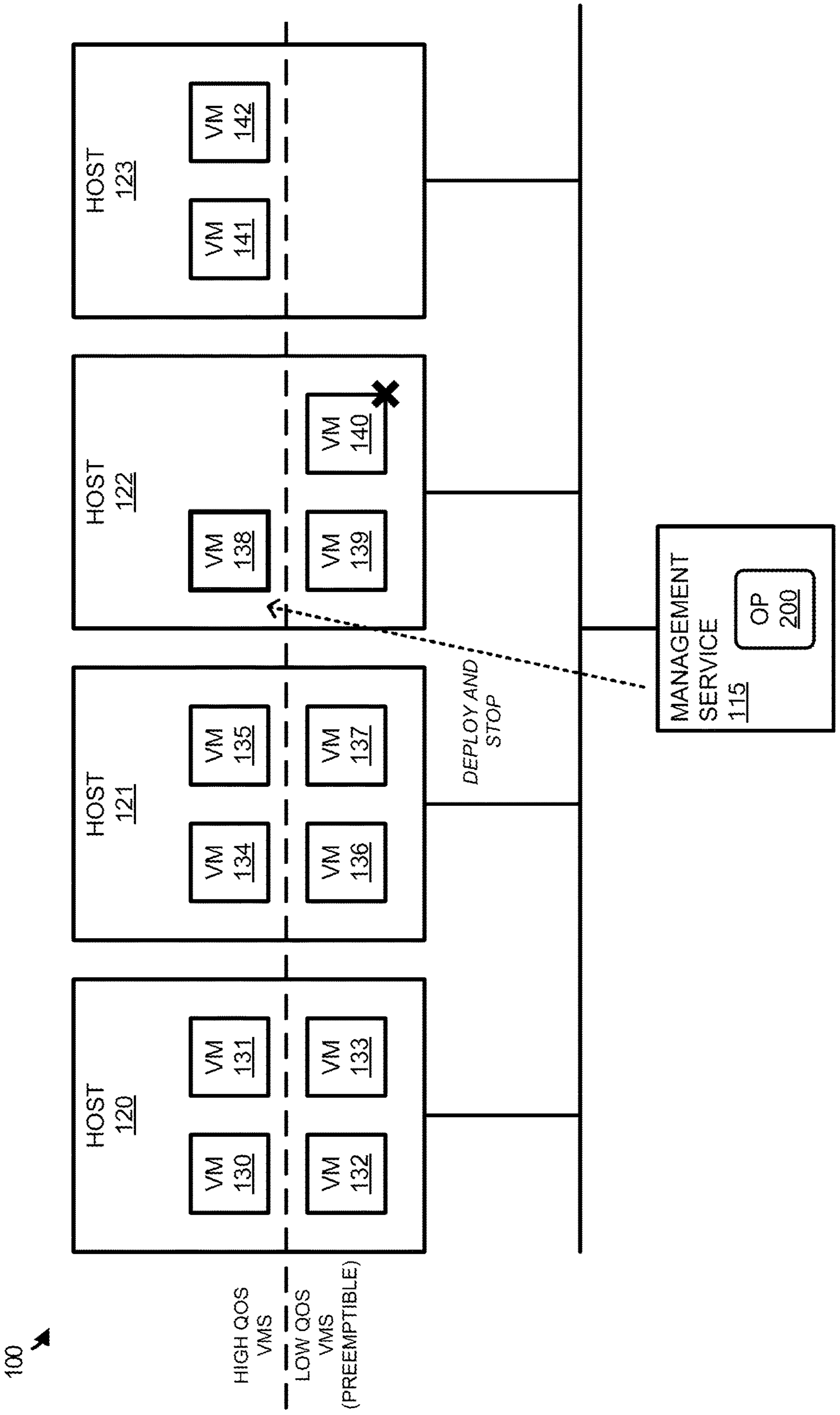
FIG. 1 illustrates a computing environment to manage virtual machine workloads in a computing environment according to an implementation.

FIG. 1 illustrates a computing environment 100 to manage virtual machine workloads in a computing environment according to an implementation. Computing environment 100 includes hosts 120-123 and management service 115. Hosts 120-123 further include virtual machines 130-142 that represent a combination of high quality of service virtual machines and low quality of service virtual machines that can be preempted. Management service 115 can execute across one or more computers and provides operation 200 that is further described below in FIG. 2.

In computing environment 100, hosts 120-123 are deployed to provide a platform for virtual machines 130-142. Hosts 120-123 are used to abstract the physical resources of the hosts and provide the abstracted resources to each of the virtual machines. The resources can comprise processing resources, memory resources, storage resources, networking resources, or other types of computing resources. Here, each virtual machine is represented as a high quality of service virtual machine (virtual machine that cannot be preempted), or a low quality of service virtual machine (virtual machine that can be preempted). The virtual machines are each allocated resources of the host to provide the required workload of the virtual machine, wherein the workload can include database processing, front-end web services, query management, networking operations, or some other workload.

When a new virtual machine is identified for deployment in computing environment 100, management service 115 is used to select a host for the workload. If a host is available with the required resources, management service 115 can select the host and deploy the required virtual machine. However, as depicted in computing environment 100, when a host is not available to support the new virtual machine, management service 115 can determine whether the new virtual machine qualifies to preempt one or more other virtual machines in computing environment 100. If the virtual machine qualifies or has been given a designation to preempt other virtual machines, management service 115 can identify one or more hosts with preemptible virtual machines that could provide the required resources for the new virtual machine. The resources for the virtual machine can include processing resources (e.g., clock cycles, cores, etc.) and memory resources. From the one or more hosts, management service 115 can select a host for the virtual machine, stop one or more preemptible virtual machines on the host to support the new virtual machine, and deploy the new virtual machine on the host. In some implementations, stopping the virtual machines can include powering off or destroying the preemptible virtual machines or can include suspending the virtual machines that liberates the processing and memory resources for the new virtual machine. An administrator can select which of these options they prefer when stopping the one or more preemptible virtual machines but can prefer the suspension operation when the preemptible virtual machines are desired to be restarted when resources become available in the environment.

As an example, virtual machine 138 is identified to be deployed in computing environment 100, management service 115 will first determine whether any host has existing resources capable of supporting the virtual machine. When no host is identified, management service 115 will identify one or more of hosts 120-123 with preemptible virtual machines that would provide the adequate resources for virtual machine 138. For example, management service 115 could identify that host 121 and host 122 could provide the required resources (i.e., reserved resources for virtual machine 138) if one or more of the preemptible virtual machines were stopped. To select a host from the set of possible hosts, management service 115 can prioritize the hosts. The prioritization can be based on the number of preemptible virtual machines executing on the host, the quantity of resources used by the preemptible virtual machines on the host, or some other factor, including combinations thereof. As an example, the host with the least quantity of preemptible virtual machines can be prioritized over other hosts.

Once prioritized, a host can be selected, such as host 122, and prepared for deploying the new virtual machine. In at least one example, host management service 115 can prioritize the virtual machines for preemption based on the quantity of resources being used by the virtual machine. Thus, for virtual machines 139-140 the virtual machines can be prioritized based on the quantity of resources used by each virtual machine. From the prioritized list of virtual machines, management service can identify preemptible virtual machines one at a time from the prioritized list until enough resources are available for virtual machine 138. Once enough resources are available, virtual machine 138 can be deployed at host 122. Advantageously, by prioritizing the virtual machines based on resource usage, a smaller quantity of preemptible virtual machines may be required to be stopped to support the new virtual machine.

In at least one example, prior to deploying virtual machine 138, management service 115 can initiate a test operation to determine whether the deployment would be successful, wherein the test can include a dry run of the virtual machines on the host (including the new virtual machine and the removal of the preemptible virtual machines) to determine whether resources would successfully be allocated to the new virtual machine. If successful, the virtual machine is deployed on the host. Otherwise, management service 115 moves to the next host in the prioritized list of hosts if one exists or, if one does not exist, can report back to the user of the computing environment that the deployment of the virtual machine was unsuccessful.

In some implementations, to perform a test on a current host, management service 115 will lock and preserve a snapshot of the resource management configuration or resource allocation for the virtual machines on the host. Once the snapshot is taken, management service 115 will remove the candidate preemptible virtual machines from the snapshot and add the proposed resources associated with the new high quality of service virtual machine to the snapshot. Management service can then determine whether the host provides adequate resources to the new virtual machine by simulating the resource allocation to the new virtual machine. Advantageously, rather than stopping preemptible virtual machines on a host prematurely, management service 115 can simulate the allocation of the new virtual machine to ensure that the required resources would be successfully made available to the new virtual machine. Once the test is complete, the one or more selected preemptible virtual machines can be stopped, and the new virtual machine can be added to the host.

Although demonstrated in the previous examples as stopping the one or more preemptible virtual machines, similar operations can be performed that lower the resource allocations associated with the preemptible virtual machines. As an example, rather than stopping virtual machine 140, virtual machine 139 and/or virtual machine 140 can have their resource allocation reduced to provide resources to virtual machine 138. The reduction can include processing resources, memory resources, and the like. Thus, rather than stopping virtual machine 140 (via destruction or suspension), virtual machine 140 can have the resources revoked, and provided to virtual machine 138. Additionally, similar test procedures can be performed by management service 115 to verify that the correct resources will be available to virtual machine 138.

Figure 2:
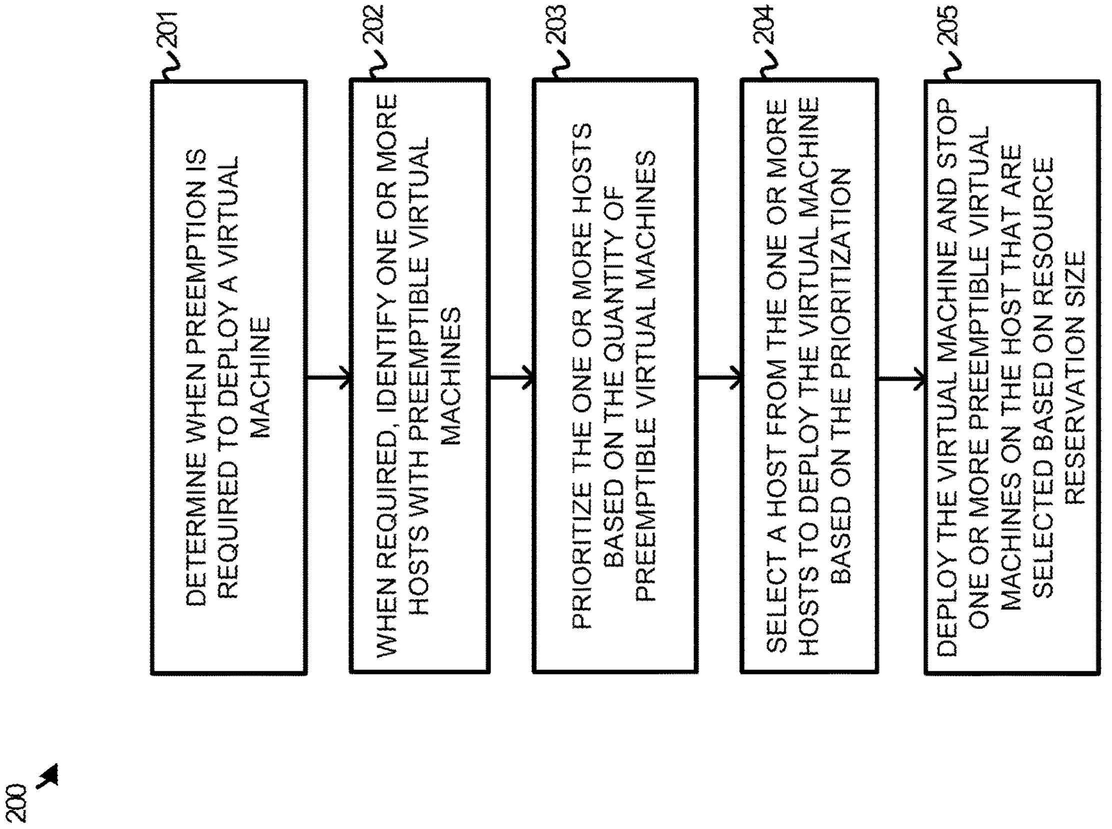
FIG. 2 illustrates an operation of a management service to deploy a virtual machine in a computing environment according to an implementation.

FIG. 2 illustrates an operation 200 of a management service to deploy a virtual machine in a computing environment according to an implementation. The steps of operation 200 are referenced parenthetically in the steps that follow with reference to systems and elements of computing environment 100 of FIG. 1.

Operation 200 includes determining (201) when preemption is required to deploy a virtual machine in a computing environment. Preemption can be required when no host in a computing environment includes the required resources (resource reservation) for the new virtual machine and the new virtual machine is associated with a quality of service that permits preempting one or more other preemptible virtual machines. When preemption is required for the virtual machine, operation 200 further includes identifying (202) one or more preemptible virtual machines that, if preempted, would permit the corresponding host to provide the resources to the new virtual machine. As an example, management service 115 can monitor hosts 120-123 and identify hosts with preemptible virtual machines that could support the new virtual machine if one or more of the preemptible virtual machines were stopped on the host. In some examples, if one or more hosts do not include preemptible virtual machines that, when stopped, can provide the resources to the new virtual machine, a notification can be provided to the administrator of computing environment 100 indicating that the addition of the new virtual machine was unsuccessful.

After the one or more hosts are identified, operation 200 also provides for prioritizing (203) the one or more hosts based on the quantity of preemptible virtual machines on the host. In some implementations, hosts will be given a higher priority if they have a larger quantity of preemptible quantity of virtual machines. In addition to or in place of using the quantity of preemptible virtual machines to prioritize the hosts, management service 115 can use the current size of available resources on each of the hosts, the resource reservations associated with the one or more preemptible virtual machines on the hosts, or some other information to prioritize the virtual machines. The resource reservations for the virtual machines can comprise memory resource reservations and processing resource reservations.

After prioritizing the one or more hosts for the new virtual machine, operation 200 further includes selecting (204) a host from the one or more hosts to deploy the virtual machine based on the prioritization. Once selected, operation 200 further includes deploying (205) the virtual machine and stopping one or more preemptible virtual machines on the selected host, wherein the one or more virtual machines are selected based on the resource reservation size of the preemptible virtual machine and the resource reservation requirement for the new virtual machine. For example, operation 200 can identify a first preemptible virtual machine, such as virtual machine 140 on host 122 and determine whether the stoppage of virtual machine 140 will provide the adequate resources to support the resource requirement or resource reservation for virtual machine 138. If the required resources for virtual machine 138 are not adequate, then management system 115 can move to the next virtual machine and repeat the same steps until the required resources are available for virtual machine 138. If the required resources are available after stopping virtual machine 140, then virtual machine 140 can be stopped and virtual machine 138 can assume at least some of the resources from stopped virtual machine 140.

In some implementations, prior to deploying virtual machine 138, management service 115 can perform a test deployment of virtual machine 138 to determine whether the deployment will be successful (e.g., determine whether processing and memory resources are available when virtual machine 140 is paused). Once the resources are adequate during the test execution or test deployment, then virtual machine 138 can be deployed and made available in computing environment 100. As an example, management service 115 can use a resource allocation snapshot associated with host 122, remove virtual machine 140 from the snapshot, and add virtual machine 138 to the snapshot. Management service 115 can then simulate the resource allocations to virtual machines 138 and virtual machine 139 to determine whether adequate resources are provided to the new virtual machine. If successful and the resources are available, management service 115 can stop virtual machine 140 and deploy virtual machine 138. Alternatively, if the test is not successful, management service 115 can identify additional preemptible virtual machines on the same host, identify another host in the environment if available, or notify an administrator that the deployment was not successful.

Figure 3:
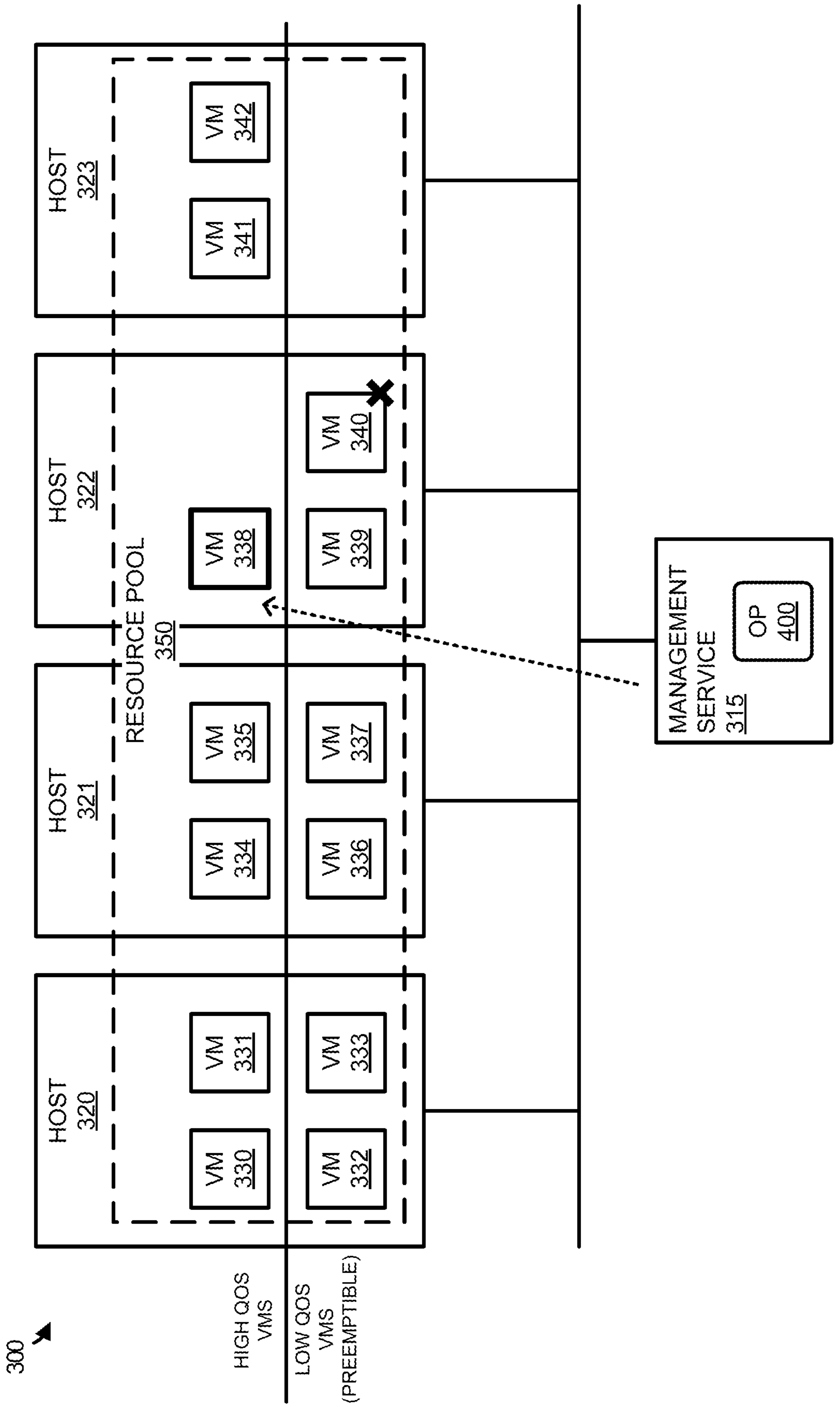
FIG. 3 illustrates a computing environment to manage virtual machine workloads for a resource pool according to an implementation.

FIG. 3 illustrates a computing environment 300 to manage virtual machine workloads for a resource pool according to an implementation. Computing environment 300 includes hosts 320-323, management service 315, and resource pool 350. Hosts 320-323 further include virtual machines 330-342 that represent a combination of high quality of service virtual machines and low quality of service virtual machines that can be preempted. Management service 315 can execute across one or more computers and provides operation 400 that is further described below in FIG. 4.

In computing environment 300, hosts 320-323 are deployed to provide a platform for virtual machines 330-342. Hosts 320-323 are used to abstract the physical resources of the hosts and provide the abstracted resources to each of the virtual machines. The resources can comprise processing resources, memory resources, storage resources, networking resources, or other types of computing resources. Here, each virtual machine is represented as a high quality of service virtual machine or a virtual machine that cannot be preempted, or a low quality of service virtual machine that can be preempted. The virtual machines are each allocated resources of the host to provide the required workload of the virtual machine, wherein the workload can include database processing, front-end web services, query management, networking operations, or some other workload. Here, unlike the diagram of computing environment 100 of FIG. 1, computing environment 300 includes resource pool 350, wherein the pool can represent memory resources, processing resources, networking resources, and the like that can be distributed across the hosts.

When a new virtual machine is to be deployed in computing environment 300, management service 315 can determine whether resources are available to allocate to the environment without disrupting other virtual machine workloads. If available, the virtual machine is deployed without requiring a stoppage of another virtual machine. However, if resources are not available, management service 315 can identify preemptible virtual machines in computing environment 300 and prioritize the preemptible virtual machines based on resource usage. Once prioritized, one or more of the preemptible virtual machines are selected based on the prioritization, wherein the resources for the one or more preemptible virtual machines can provide the resource reservation associated with the new virtual machine. For example, computing environment 300 includes six preemptible virtual machines and management service 315 can select a subset of the six preemptible virtual machines based on prioritization of the virtual machines. In at least one implementation, management service 315 will select the preemptible virtual machine with the highest resource reservation (e.g., virtual machine 340) and determine whether the resources freed from virtual machine 340 would provide the adequate resources to the new virtual machine 338. If the resources are not available via the stoppage of virtual machine 140, then management service 115 can move to another virtual machine in the prioritized list and stop that virtual machine. Once enough resources are made available via the stoppage of one or more preemptible virtual machines, host 122 can stop the selected virtual machines and deploy new virtual machine 338.

Figure 4:
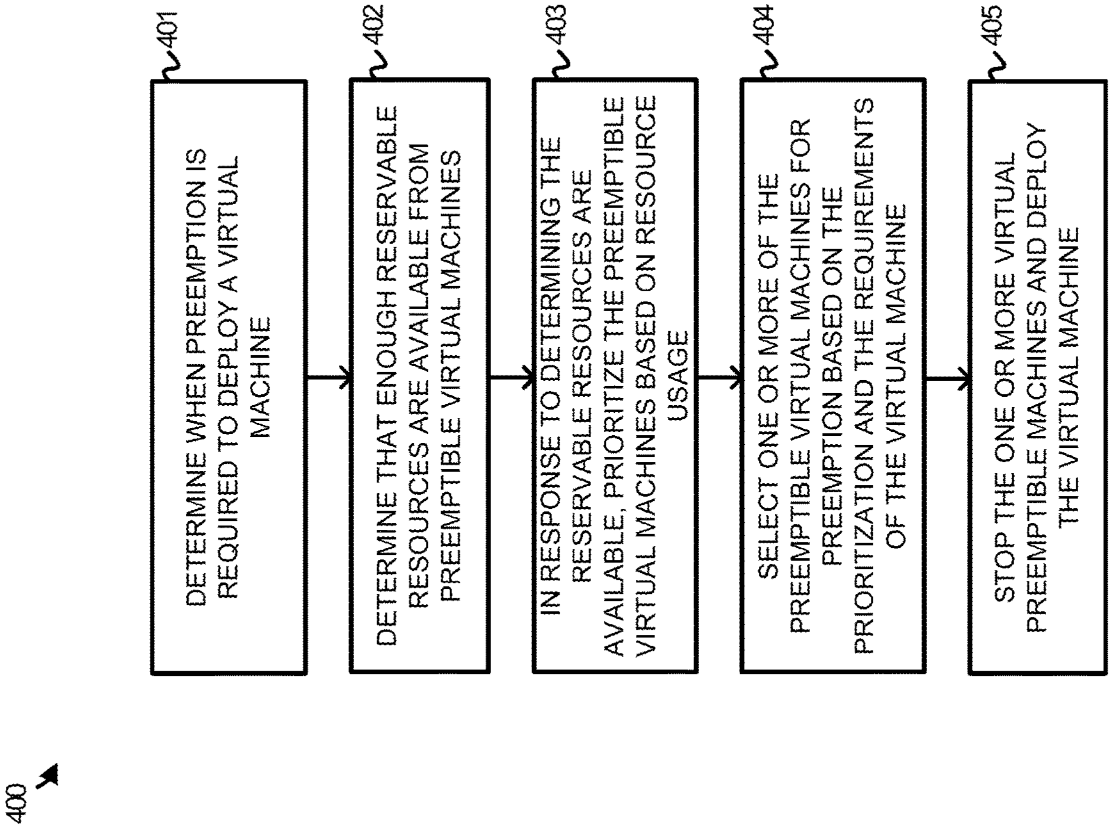
FIG. 4 illustrates an operation of a management service to deploy a virtual machine based on resource pool constraints of a computing environment according to an implementation.

FIG. 4 illustrates an operation 400 of a management service to deploy a virtual machine based on resource pool constraints of a computing environment according to an implementation. The steps of operation 400 are referenced parenthetically in the paragraphs that follow with reference to systems and elements of computing environment 300 of FIG. 3.

For operation 400, management service 315 determines (401) when preemption is required to deploy the virtual machine. In making the determination, management service 315 may identify whether one or more additional resources are required to deploy the new virtual machine, wherein the resources can comprise a memory pool, a processing, pool, or some other pooled resource distributed across hosts 120-123. For example, the currently executing virtual machines can use 40 gigabytes of memory of a total 50 gigabytes of memory available in a pool. If the new virtual machine requires more than 10 gigabytes of memory, then resources would not be available for the new virtual machine.

Once preemption is required, operation 400 then determines (402) whether enough reservable resources can be made available by stopping one or more preemptible virtual machines. When resources cannot be made by stopping one or more preemptible virtual machines, management service 315 can generate a notification that is provided to an administrator to indicate that the new virtual machine cannot be deployed. Management service 315 can also modify or change the resources of the pool in some examples. If the one or more preemptible virtual machines can be stopped to provide the resources to the new virtual machine or reservable resources can be made available to the new virtual machine, operation 400 prioritizes (403) the preemptible virtual machines in computing environment 300 based on resource usage or reservations of the virtual machines. In some examples, the preemptible virtual machines that are using the most resources (e.g., processing, memory, and the like) will be prioritized to be stopped over the preemptible virtual machines that are associated with less resources.

After the preemptible virtual machines are prioritized, operation 400 selects (404) one or more of the preemptible virtual machines for preemption based on the prioritization and the requirements of the new virtual machine. In at least one example, management service 315 will identify the highest priority virtual machine from the list and determine whether stopping the highest priority virtual machine would provide the required reserved resources to the new virtual machine. If the required resources are not provided by stopping the highest priority virtual machine, then management service 315 can move to the next prioritized virtual machine until enough reserved resources are made available for the new virtual machine on the host. If the required resources are provided by stopping the highest priority virtual machine (e.g., virtual machine 338), then operation 400 stops (405) the one or more preemptible virtual machines to provide resources for the new virtual machine and deploys the new virtual machine using the freed resources from the preemptible virtual machines.

In some implementations, prior to deploying the virtual machine, a test can be implemented on the host to determine whether the deployment of the virtual machine is successful. The test can be used to verify that memory resources, processing resources, or other resources are available to the newly deployed virtual machine after the stoppage of the one or more preemptible virtual machine. Thus, after stopping virtual machine 340, a test can be performed at for the deployment of virtual machine 338 to determine whether the virtual machine deployment will be successful and receive the requisite resources. If the test fails for the virtual machine, then management service 315 can stop an additional preemptible virtual machine or generate a notification that the deployment of the new virtual machine failed.

In some implementations, the test can comprise a simulation or dry run performed by management service 315. The simulation can use a snapshot of the resource allocation of the current environment, including the preemptible virtual machines. Once a resource allocation snapshot is taken, the resources associated with the selected preemptible virtual machines can be removed and the proposed resources associated with the new virtual machine can be added. The simulation can determine whether adequate resources would be provided to the new virtual machine. Advantageously, the test can be performed at management service 315 prior to stopping or deploying virtual machines in the computing environment.

Although demonstrated in the previous example as stopping virtual machine 340 to provide the resources for virtual machine 338, management service 315 can reduce the resources of one or more preemptible virtual machines to support the execution of virtual machine 338. The reduced resources can include processing resources, memory resources, or other resources required by virtual machine 338. For example, rather than stopping virtual machine 340, the resources of virtual machine 340 can be reduced until the required resources for virtual machine 338 are available. Management service 315 can perform a test or simulation using a resource snapshot to verify that the resources are going to support virtual machine 338 as described above.

Figure 5:
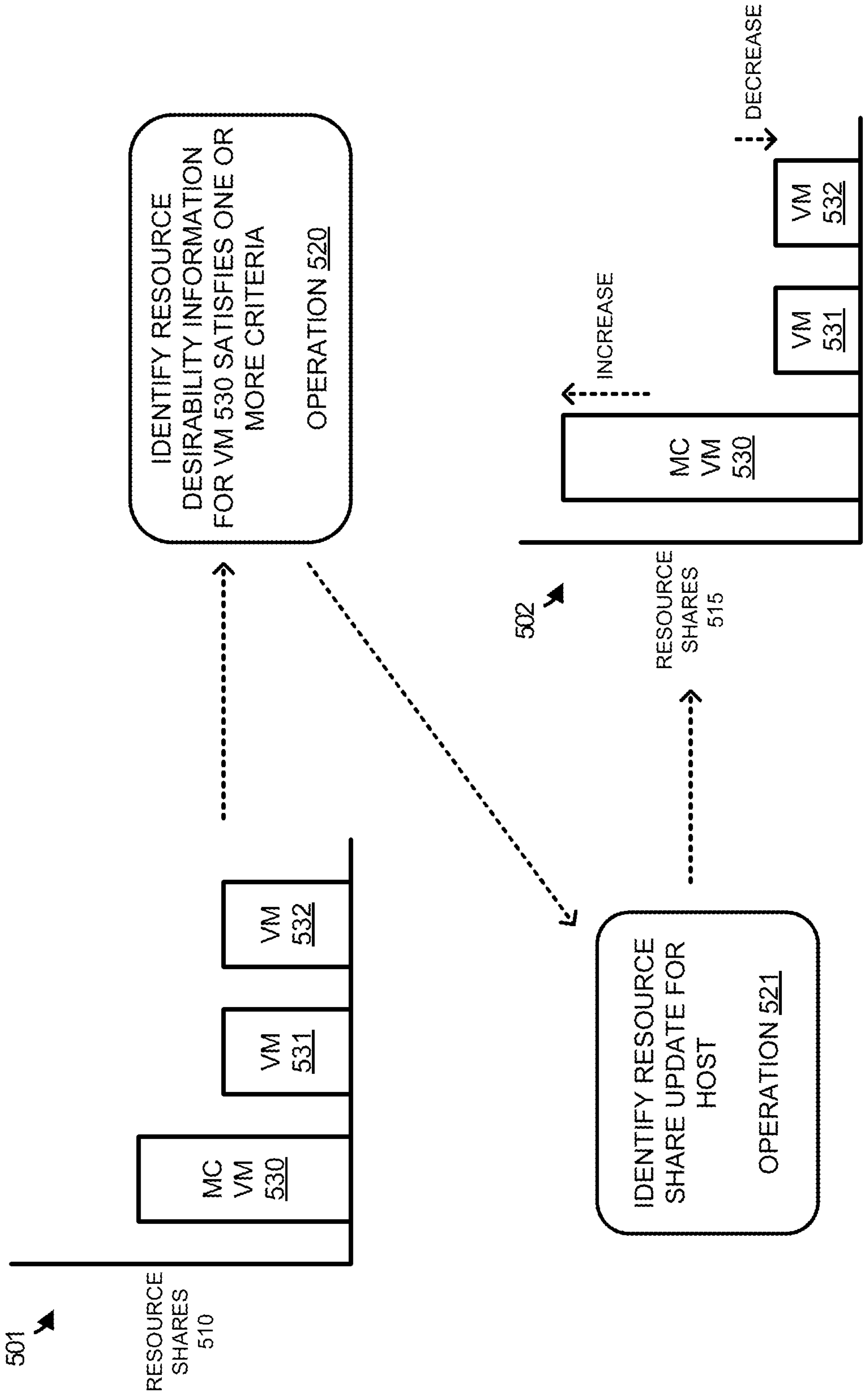
FIG. 5 illustrates an operational scenario of dynamically modifying resource shares for virtual machines on a host according to an implementation.

FIG. 5 illustrates an operational scenario 500 of dynamically modifying resource shares for virtual machines on a host according to an implementation. Operational scenario 500 includes graphs 501-502 and operations 520-521. Graphs 501-502 are used to represent resource shares 510 for virtual machines 530-532, wherein virtual machine 530 comprises a mission critical virtual machine that can preempt one or more preemptible virtual machines. Additionally, virtual machines 531-532 are representative of virtual machines that can be preempted by mission critical virtual machines. Operational scenario 500 can be used in addition to or in place of the operations described above with respect to FIGS. 1-4. Specifically, while FIGS. 1-4 prepare resources for a virtual machine prior to deployment of the virtual machine, operational scenario 500 describes the allocation and management of resources for a virtual machine after deployment. Operational In operational scenario 500, virtual machines 530-532 are provided with a first allocation of resource shares 530-532, wherein the resource shares represent memory, processing, or some other resource shares for the virtual machines. The resource shares can represent resources available to the virtual machines in addition to the minimum resource allocation. Here, mission critical virtual machine 530 is allocated a larger resource share than virtual machines 531-532. The first allocation of resource shares can be a default resource share that can be assigned by an administrator of the environment or can be defined in some other manner.

After the first resource shares are allocated to each of the virtual machines, operation 520 is performed that identifies resource desirability information for virtual machine 530 and determines when the resource desirability information satisfies one or more criteria. As an example, virtual machine 530 may execute an application that uses a significant percentage of the memory resources available to the virtual machine via the first resource shares for the virtual machine. Consequently, to better support the application on the virtual machine, operation 521 is used to identify a resource share update for virtual machines 530-532.

In some implementations, in identifying the update for the virtual machines, the management service will determine whether preemptible virtual machines are available to reduce shares or be stopped on the host. If no preemptible virtual machines are available or resources are not available to be diverted from the preemptible virtual machines to virtual machine 530, then the management service can look to migrate virtual machine 530 to another host in the computing environment. If preemptible virtual machines are available to allocate more resource shares to virtual machine 530 (i.e., virtual machines 531-532), the resource shares for the virtual machines can be reduced and allocated to virtual machine 530. The reduction can be a defined quantity of resource shares from each of the possible preemptible virtual machines (e.g., 5 resource shares from each), can be a percentage of the resource shares from each of the preemptible virtual machines, or some other portion of the resources from the preemptible virtual machines. Once the resources are removed or deallocated from the preemptible virtual machines, then the resource shares can be allocated to virtual machine 530 which is demonstrated in graph 502.

In some implementations, mission critical virtual machine 530 can be allocated a maximum amount of resource shares. If the maximum amount is reached, then virtual machine 530 can be migrated to another virtual machine. The migration can be based on the resource requirements of the virtual machine, the resources available on the other hosts, or some other factor.

Figure 6:
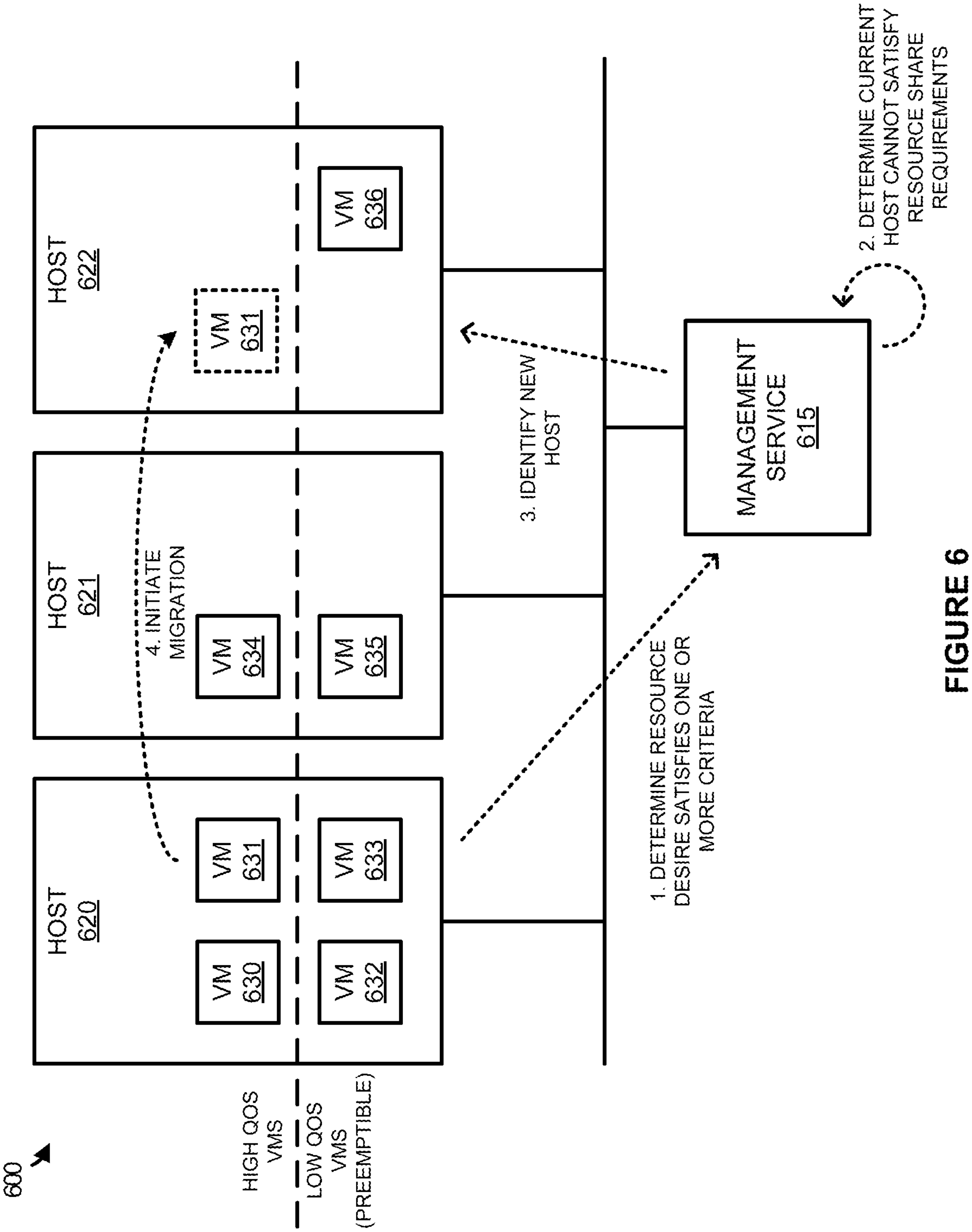
FIG. 6 illustrates an operational scenario of migrating a virtual machine based on desired resource shares for the virtual machine according to an implementation.

FIG. 6 illustrates an operational scenario 600 of migrating a virtual machine based on desired resource shares for the virtual machine according to an implementation. Operational scenario 600 includes hosts 620-622 and management service 615. Hosts 620-622 further includes virtual machines 630-636. Operational scenario 600 can be performed in addition to the operations described in FIGS. 1-4 or can be performed in place of the operations of the operations described in FIGS. 1-4.

In operational scenario 600, virtual machines 630-636 are deployed on hosts 620-622 to provide various operations, such as data processing operations, database management operations, front-end service operations, or some other operation or application. The virtual machines can be associated with different qualities of service, wherein virtual machines with different qualities of service can be preempted to support other virtual machines, such as mission critical virtual machines. Here, virtual machines 630, 631, and 634 represent virtual machines with a quality of service that can preempt virtual machines 632, 633, 635, and 636 with a lower quality of service.

During the execution of the virtual machines, management service 615 determines, at step 1, that the resource desires associated with virtual machine 631 satisfy one or more criteria. In some implementations, virtual machines can be assigned a base resource requirement and can be allocated additional resources as part of resource shares for resources not reserved for a particular virtual machine. For example, when virtual machine 631 indicates a desire for additional resources to provide a corresponding operation, additional resources can be allocated to virtual machine 631. The initial resource share allocated to the virtual machine can be based on the type of virtual machine (e.g., mission critical), can be based on the other virtual machines on the host (e.g., mission critical, preemptible, etc.), or can be based on some other factor.

Here, virtual machine 631 is allocated first resource shares on host 620 and management service 615 determines that virtual machine 631 requires additional resources based on resource desirability information associated with virtual machine 631. In some implementations, management service 615 can determine that the criteria are satisfied when the virtual machine uses a threshold percentage of the current resources provided to the virtual machine. In response to determining that the one or more criteria are satisfied, management service 615 determines that the current host cannot satisfy the resource share requirements for the virtual machine at step 2. In some examples, management service 615 will determine whether resource shares can be allocated from another virtual machine on host 620, such as virtual machines 632-633. Resource shares can be allocated from virtual machines 632-633 when virtual machines 632-633 are not at a minimum quantity of resource shares, when virtual machine 631 is not at a maximum quantity of resource shares, when allocating resource shares to virtual machine 631 would not reduce the quality of service or resource shares available to virtual machine 630, or can be based on some other factor. As an example, virtual machine 631 may, prior to the determination of virtual machine 631 satisfying criteria for increased resource shares, be allocated a maximum quantity of resource shares at host 620. Consequently, when additional resources are required, management service 615 can select a new host for the virtual machine at step 3.

In some examples, management service 615 can first identify whether one or more other hosts in the computing environment can provide more resources than host 620. If more than one host is available, management service 615 can select the host from the set of available hosts based on the available resources on the host, the number of preemptible virtual machines on the host, or some other factor. Once selected, management service 615 can initiate a migration of the virtual machine from host 620 to the second host 622 at step 4. In some examples, if no host is available to provide additional resources to virtual machine 631, management service 615 can maintain virtual machine 631 at host 620. Additionally, management service 615 can notify an administrator of the computing environment that a virtual machine requires additional resources, can remove one or more preemptible virtual machines in the computing environment to provide additional resources, or can perform some other action to provide resources for the virtual machine.

Figure 7:
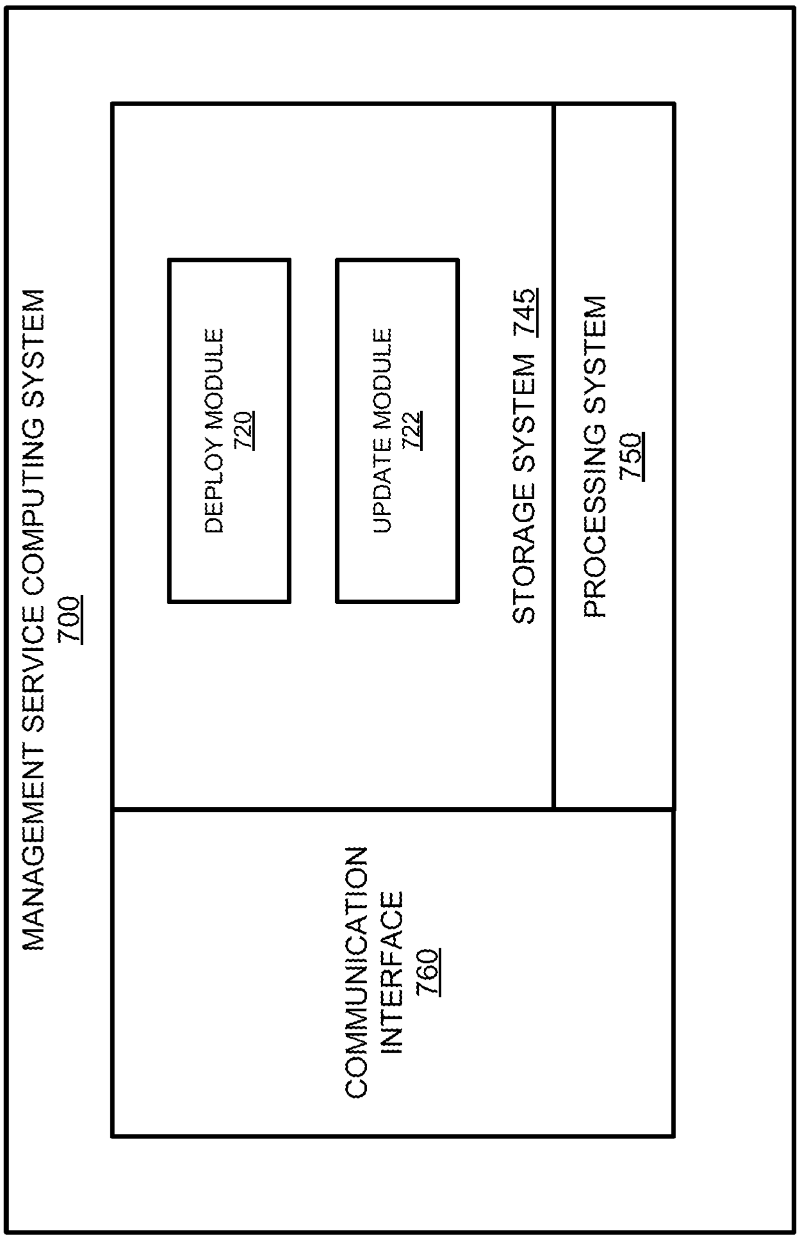
FIG. 7 illustrates a management service computing system to manage virtual machine workloads in a computing environment according to an implementation.

FIG. 7 illustrates a management service computing system 700 to manage virtual machine workloads in a computing environment according to an implementation. Management computing system 700 is representative of any computing system or systems with which the various operational architectures, processes, scenarios, and sequences disclosed herein for a management service can be implemented. Management computing system 700 is an example of management service 115 of FIG. 1 of management service 615 of FIG. 6, although other examples may exist. Management computing system 700 includes storage system 745, processing system 750, and communication interface 760. Processing system 750 is operatively linked to communication interface 760 and storage system 745. Communication interface 760 may be communicatively linked to storage system 745 in some implementations. Management computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format-including combinations thereof. Communication interface 760 may be configured to communicate with hosts of a computing environment, administrative or console devices, or some other computing device.

Processing system 750 comprises microprocessor and other circuitry that retrieves and executes operating software from storage system 745. Storage system 745 may include volatile and nonvolatile, removable, and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 deploy module 720 and update module 722. The operating software on storage system 745 may further include an operating system, utilities, drivers, network interfaces, applications, or some other type of software. When read and executed by processing system 750 the operating software on storage system 745 directs management computing system 700 to operate as a management service described herein in FIGS. 1-6.

In at least one implementation, deploy module 720 directs processing system 750 to determine when preemption is required to deploy a virtual machine in a computing environment. The preemption determination can be based on the quantity of reserved resources (i.e., processing, memory, and the like) for the new virtual machine, the quality of service associated with the virtual machine and whether the virtual machine can preempt one or more other virtual machines, the availability of resources, on the hosts of the computing environment, or some other factor. When preemption is required to deploy the virtual machine, deploy module 720 can direct processing system 750 to identify one or more hosts of a plurality of hosts in the computing environment capable of supporting the virtual machine when at least one preemptible virtual machine of one or more preemptible virtual machines is stopped on a corresponding host of the one or more host. Once the one or more hosts are identified, deploy module 720 can direct processing system 750 to prioritize the one or more hosts based on a quantity of preemptible virtual machines on each of the one or more hosts and select a host from the one or more hosts to deploy the virtual machine based on the prioritization of the one or more hosts. After the host is selected, deploy module 720 directs processing system 750 to stop the at least one preemptible virtual machine on the host and deploy the virtual machine.

In some implementations, a computing environment can use resource pools that can distribute memory and processing resources across multiple hosts. For example, a resource pool can comprise a memory pool that is distributed across four different hosts. When a new virtual machine is to be deployed in the environment, deploy module 720 can direct processing system 750 to determine whether preemption is necessary to deploy a virtual machine, wherein preemption is used to stop one or more virtual machines with a quality of service that permits the virtual machines to be stopped to provide resources to higher quality of service virtual machine. Preemption can be determined based on the required resources for the new virtual machine, based on the available memory and processing resources in the pool for the computing environment, or based on some other factor. When preemption is not required, the virtual machine can be deployed without stopping other virtual machines. In contrast, when preemption is required deploy module 720 directs processing system 750, to prioritize the preemptible virtual machines based on resource usage, wherein preemptible virtual machines with more resource usage will be prioritized to be stopped over virtual machines with less resource usage. Once the preemptible virtual machines are prioritized, deploy module 720 directs processing system 750 to select one or more of the preemptible virtual machines based on the prioritization and the resource reservation requirements for the new virtual machine. Specifically, deploy module 720 will look to select the minimum quantity of preemptible virtual machines from the prioritized list that would provide the required resources for the new virtual machine. As an example, if five preemptible virtual machines were available to be stopped, deploy module 720 can select the two virtual machines with the highest priority to be stopped that would provide the minimum resources for the new virtual machines. Once the one or more preemptible virtual machines are selected, deploy module 720 will direct processing system 750 to stop the one or more preemptible virtual machines and deploy the new virtual machines.

In some examples, prior to deploying a virtual machine in an environment, either on a single host or in a pool of hosts, deploy module 720 can perform a test of deploying the new virtual machine while pausing the one or more preemptible virtual machines. The test can be used to verify that the required resources are successfully made available to the new virtual machine. If the test is successful, the new virtual machine can be made available in the environment while stopping the one or more preemptible virtual machines. Otherwise, if not successful, the selection process can be repeated to identify another host or additional preemptible virtual machines to support the execution of the new virtual machine.

In some implementations, in addition to or in place of the deployment operations described above, update module 722 can be used to modify the resource shares associated with virtual machines. In at least one example, update module 722 directs processing system 750 to monitor resource desirability information for virtual machines in a computing environment that can preempt or take resources from one or more preemptible virtual machines. Resource desirability information can indicate the percentage of resources used that are allocated to the virtual machine, including reserved resources and resource shares. When a large portion of the resources for a virtual machine are being used (e.g., 80 percent or some other threshold value), update module 722 directs processing system 750 to attempt a modification to the resource shares associated with the virtual machine.

For example, a mission critical virtual machine can be deployed on a host with a plurality of preemptible virtual machines. Each of the virtual machines on the host can be allocated a first resource share of resources from the host, wherein the resource share can be assigned by an administrator or by some other mechanism. During the execution of the virtual machines on the host, management service computing system 700 can determine that the mission critical virtual machine satisfies one or more criteria for increased resource shares. In response to the determination, resource shares allocated to the preemptible virtual machines can be removed and added to the mission critical virtual machine. Although demonstrated as reducing the amount of resource shares from the preemptible virtual machines, in some examples, the preemptible virtual machines can be stopped to provide additional resources to the virtual machine associated with the higher quality of service. The one or more preemptible virtual machines may only be stopped when the available shares have been exhausted to be provided to the higher quality of service virtual machine.

In some implementations, update module 722 will first determine whether resource shares can be increased for the virtual machine on the current host. The virtual machine may not be able to have increased shares if the virtual machine has the maximum quantity of shares (configurable by an administrator), if no shares are available to the host to be allocated to the virtual machine, if other mission critical virtual machines are also on the host that would not receive an adequate quality of service, or some other factor. In some implementations, if a first mission critical or high priority virtual machine is provided with increased resources, other mission critical or high priority virtual machines on the host can also have resources increased to coincide with the current virtual machine.

In some examples, when resource shares are not available on the current host, update module 722 directs processing system 750 to select another host to support the virtual machine. If a host is available, the virtual machine can be migrated, wherein the destination host can be selected with the most available resources, the fewest resources used by a mission critical virtual machine, or some other selection mechanism. If a host is not available for the virtual machine, then update module 722 can maintain the virtual machine on the current host and, if configured, generate a notification for an administrator of the environment. The notification can be provided via email, standalone application, web interface, or some other mechanism.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:

determining when preemption is required to deploy a virtual machine in a computing environment;

when preemption is required to deploy the virtual machine, identifying, in the computing environment, one or more hosts of a plurality of hosts capable of supporting the virtual machine by stopping at least one preemptible virtual machine of one or more preemptible virtual machines on a corresponding host of the one or more hosts;

prioritizing the one or more hosts based on a quantity of preemptible virtual machines on each of the one or more hosts;

selecting a host with a largest quantity of preemptible virtual machines from the one or more hosts to deploy the virtual machine based on the prioritization of the one or more hosts;

stopping the at least one preemptible virtual machine on the host, by performing at least one of powering off, destroying, and suspending of the at least one preemptible virtual machine on the host, and preserving physical processing and memory resources of the host that have been used by the at least one preemptible virtual machine; and deploying the virtual machine on the host, by abstracting at least part of the preserved physical processing and memory resources of the host that have been used by the at least one preemptible virtual machine and providing the abstracted physical processing and memory resources to the virtual machine.

2. The method of claim 1, wherein the host executes the at least one preemptible virtual machine and one or more additional preemptible virtual machines, and wherein stopping that at least one preemptible virtual machine comprises:

prioritizing the at least one preemptible virtual machine and the one or more additional preemptible virtual machines based on resource reservations by each of the at least one preemptible virtual machine and the one or more additional preemptible virtual machines;

selecting the at least one preemptible virtual machine to be stopped to support the virtual machine based on the prioritization of the at least one preemptible virtual machine and the one or more additional preemptible virtual machines, wherein the stoppage of the at least one preemptible virtual machine provides resources of the host to support a resource reservation of the virtual machine; and stopping the at least one preemptible virtual machine to provide resources of the host to support a resource reservation of the virtual machine.

3. The method of claim 2, wherein the resource reservations comprise memory resource reservations and processing resource reservations.

4. The method of claim 1 further comprising:

after stopping the at least one preemptible virtual machine, initiating a test of the virtual machine at the host;

determining when the test is successful; and wherein deploying the virtual machine on the host occurs in response to determining when the test is successful.

5. The method of claim 1, wherein determining when preemption is required to deploy the virtual machine in the computing environment comprises determining whether a resource reservation is available in the plurality of hosts to support a resource reservation of the virtual machine.

6. The method of claim 1 further comprising:

monitoring resource desirability information for the virtual machine on the host;

determining that the resource desirability information for the virtual machine satisfies one or more criteria; and in response to determining that the resource desirability information for the virtual machine satisfies the one or more criteria:

increase resource shares for the virtual machine on the host; and decrease resource shares of one or more other preemptible virtual machines on the host.

7. A computing apparatus comprising:

one or more non-transitory computer readable storage media;

a processing system operatively coupled to the one or more non-transitory computer readable storage media; and program instructions stored on the one or more non-transitory computer readable storage media that, when executed by the processing system, direct the computing apparatus to:

determine when preemption is required to deploy a virtual machine in a computing environment;

when preemption is required to deploy the virtual machine, identify, in the computing environment, one or more hosts of a plurality of hosts capable of supporting the virtual machine by stopping at least one preemptible virtual machine of one or more preemptible virtual machines on a corresponding host of the one or more hosts;

prioritize the one or more hosts based on a quantity of preemptible virtual machines on each of the one or more hosts, the prioritization giving a higher priority to a larger quantity of preemptible virtual machines;

select a host from the one or more hosts to deploy the virtual machine based on the prioritization of the one or more hosts;

stop the at least one preemptible virtual machine on the host, by performing at least one of powering off, destroying, and suspending of the at least one preemptible virtual machine on the host, and preserving physical processing and memory resources of the host that have been used by the at least one preemptible virtual machine; and deploy the virtual machine on the host, by abstracting at least part of the preserved physical processing and memory resources of the host that have been used by the at least one preemptible virtual machine and providing the abstracted physical processing and memory resources to the virtual machine.

8. The computing apparatus of claim 7, wherein the host executes the at least one preemptible virtual machine and one or more additional preemptible virtual machines, and wherein stopping that at least one preemptible virtual machine comprises:

prioritizing the at least one preemptible virtual machine and the one or more additional preemptible virtual machines based on resource reservations by each of the at least one preemptible virtual machine and the one or more additional preemptible virtual machines;

selecting the at least one preemptible virtual machine to be stopped to support the virtual machine based on the prioritization of the at least one preemptible virtual machine and the one or more additional preemptible virtual machines, wherein the stoppage of the at least one preemptible virtual machine provides resources of the host to support a resource reservation of the virtual machine; and stopping the at least one preemptible virtual machine to provide resources of the host to support a resource reservation of the virtual machine.

9. The computing apparatus of claim 8, wherein the resource reservations comprise memory resource reservations and processing resource reservations.

10. The computing apparatus of claim 7, wherein the program instructions further direct the computing apparatus to:

after stopping the at least one preemptible virtual machine, initiate a test of the virtual machine at the host;

determine when the test is successful; and wherein deploying the virtual machine on the host occurs in response to determining when the test is successful.

11. The computing apparatus of claim 7, wherein determining when preemption is required to deploy the virtual machine in the computing environment comprises determining whether a resource reservation is available in the plurality of hosts to support a resource reservation of the virtual machine.

12. The computing apparatus of claim 7, wherein the program instructions further direct the computing apparatus to:

monitor resource desirability information for the virtual machine on the host;

determine that the resource desirability information for the virtual machine satisfies one or more criteria; and in response to determining that the resource desirability information for the virtual machine satisfies the one or more criteria:

increase resource shares for the virtual machine on the host; and decrease resource shares of one or more other preemptible virtual machines on the host.

* * * * *